(12) United States Patent
Gueorguiev et al.

(10) Patent No.: US 11,494,756 B2
(45) Date of Patent: Nov. 8, 2022

(54) PAYMENT TRANSACTIONS WITH INTEGRATED POINT OF SALE TERMINALS

(71) Applicant: PHOS SERVICES LTD., London (GB)

(72) Inventors: Ivo Alexandrov Gueorguiev, Sofia (BG); Konstantin Yanev Dzhelebov, Sliven (BG); Antonina Ivanova Martinova, Sofia (BG)

(73) Assignee: PHOS SERVICES LTD, London (GB)

( * ) Notice: Subject to any disclaimer, the term of this patent is extended or adjusted under 35 U.S.C. 154(b) by 0 days.

(21) Appl. No.: 16/491,580

(22) PCT Filed: Mar. 15, 2017

(86) PCT No.: PCT/BG2017/000004
§ 371 (c)(1),
(2) Date: Sep. 6, 2019

(87) PCT Pub. No.: WO2018/165724
PCT Pub. Date: Sep. 20, 2018

(65) Prior Publication Data
US 2020/0042975 A1 Feb. 6, 2020

(51) Int. Cl.
*G06Q 20/32* (2012.01)
*G06Q 20/38* (2012.01)
*G06Q 20/02* (2012.01)
*G06Q 20/40* (2012.01)
*G06Q 20/42* (2012.01)

(52) U.S. Cl.
CPC ..... *G06Q 20/3227* (2013.01); *G06Q 20/3278* (2013.01); *G06Q 20/4012* (2013.01); *G06Q 20/40145* (2013.01); *G06Q 20/425* (2013.01)

(58) Field of Classification Search
CPC .......... G06Q 20/3223; G06Q 20/4012; G06Q 20/38215; G06Q 20/027; G06Q 20/3278; G06Q 20/3829; G06Q 2220/00
USPC ...................................... 705/35–45
See application file for complete search history.

(56) References Cited

U.S. PATENT DOCUMENTS

| | | | |
|---|---|---|---|
| 2004/0087339 A1* | 5/2004 | Goldthwaite ........ | G06Q 20/341 455/558 |
| 2013/0073462 A1* | 3/2013 | Zanzot ................. | G06Q 20/405 705/44 |
| 2015/0161586 A1* | 6/2015 | Bailey .................. | G06Q 20/405 705/44 |
| 2015/0327071 A1* | 11/2015 | Sharma .............. | G06Q 20/3278 726/6 |

* cited by examiner

*Primary Examiner* — Hai Tran
(74) *Attorney, Agent, or Firm* — Horizon IP PTE Ltd.

(57) ABSTRACT

A mobile communication device accepts payments and is capable of integration of retail business applications without additional hardware. It allows merchants to accept card present payments directly without any need for additional external hardware, such as Point of Sale (POS) terminals. The merchant can accept card present payments from a contactless credit/debit card, from a mobile smart phone or another mobile telecommunication device supporting payment card digitization, or from a mobile smart phone or another mobile telecommunication device that carries or can access and transmit relevant payment information.

30 Claims, 5 Drawing Sheets

PAYMENT TRANSACTIONS WITH INTEGRATED POINT OF SALE TERMINALS

FIELD OF THE INVENTION

The invention relates to card present payments to retailers. More precisely, the invention relates to payment acceptance directly on a mobile communication device without additional external hardware, such as Point of Sale (POS) terminals.

BACKGROUND OF THE INVENTION

With the development of plastic payment cards (credit or debit) merchants have always had to have specialized hardware to accept payments. This hardware is generally referred to as Point of Sale (POS) terminals.

Initially cards were accepted through manual imprinters, which did not allow for real time approval. Later, businesses moved to Electronic Authorizations and the first electronic credit card authorizations were done over the phone, and this often took upward of 5 minutes. A new breed of POS terminals, allowing fast approval of transactions emerged in 1979, which greatly reduced the time required to process a payment card.

In recent years, new models of POS terminals appeared with the objective to enlarge the universe of merchants working with POS terminals and increase the functionalities of the POS terminals.

To reach more merchants, mobile POS (mPOS) terminals were developed. These include Square®, iZettle®, and many others. They connect to a mobile telecommunication device and use it as an intermediary to communicate with the payment processing networks.

To increase functionalities and bring more value to merchants a new type of POS terminals was introduced in the last years, allowing running of third party applications on the POS terminal. Examples are Clover®, Poynt®, Revell® and others.

In all the cases above, however, merchants always need to have additional hardware to accept payment cards.

The current invention allows merchants to accept payments from contactless cards or from mobile smart phones or other mobile communication devices without the need for additional or modification of the existing hardware. Payments can be accepted on any mobile smart phone or another mobile telecommunication device (tablet, computer, etc) as long as it has the necessary characteristics. The invention allows use of different communication interface, including NFC®, FeliCa® and others. There is no need for additional or modification of the existing hardware in the accepting mobile communication device. At the same time the invention allows an easy integration of the payment acceptance function with a multiple of business applications provided by third parties that merchants can find useful, such as loyalty, budgeting, stock management, campaign management, etc. The invention thus contributes to the proliferation of accepting payments from contactless credit/debit cards and payment enabled mobile communication devices and provides merchants with the utility of additional integrated functionalities.

SUMMARY OF THE INVENTION

Methods and systems for payment transactions with integrated POS terminals are described. In one embodiment of the invention, the method includes receiving a request for a payment transaction from a consumer at an accepting mobile communication device of a merchant, wherein the request comprises payment information and transaction information, and receiving an authentication from the consumer at the accepting mobile communication device. The request may be sent via a contactless payment card or a payment enabled mobile communication device of the consumer. The request may also be sent via a digitized card on the payment enabled mobile communication device of the consumer. The method further includes sending an authorization request message from the accepting mobile communication device to one or more processing entities, wherein the authorization request message comprises the payment information and the transaction information, and wherein the authorization request message is encrypted by a point-of-sale module residing in a secure element within the accepting mobile communication device. The method also includes processing the authorization request message by the one or more processing entities and sending an authorization response message to the accepting mobile communication device, and providing the authorization response message to the consumer. In some embodiments, the method includes sending the transaction information from the accepting mobile communication device to a backend server and forwarding the transaction information from the backend server to third party application servers of services the merchant is subscribed for. The third party application servers can modify the transaction information and the modified transaction information is collected at the backend server, which is then forwarded to the accepting mobile communication device.

In another embodiment of the invention, the system includes an accepting mobile communication device of a merchant to receive a request for a payment transaction from a consumer, wherein the request comprises payment information and transaction information, to receive an authentication from the consumer, to send an authorization request message to one or more processing entities, wherein the authorization request message comprises the payment information and the transaction information, and wherein the authorization request message is encrypted by a point-of-sale module residing in a secure element within the accepting mobile communication device, and to provide an authorization response message to the consumer. The system also includes a one or more processing entities to process the authorization request message and to send the authorization response message to the accepting mobile communication device. In some embodiments, the request for a payment transaction may be sent via a contactless payment card or a payment enabled mobile communication device of the consumer. The request may also be sent via a digitized card on the payment enabled mobile communication device of the consumer. In some embodiments, the system also includes a backend server to receive the transaction information from the accepting mobile communication device and to send it to third party application servers of services the merchant is subscribed for. The backend server also collects a modified transaction information from the third party application servers and forwards it to the accepting mobile communication device. The third party application servers receive the transaction information from the backend server and provide a modified transaction information back to the backend server.

BRIEF DESCRIPTION OF THE DRAWINGS

The invention is illustrated by way of example and not by way of limitation in the figures of the accompanying drawings, in which.

DETAILED DESCRIPTION

Described herein are methods and systems for payment transactions with integrated POS terminals. Various features associated with the operation of the present invention will now be set forth.

Figure 1:
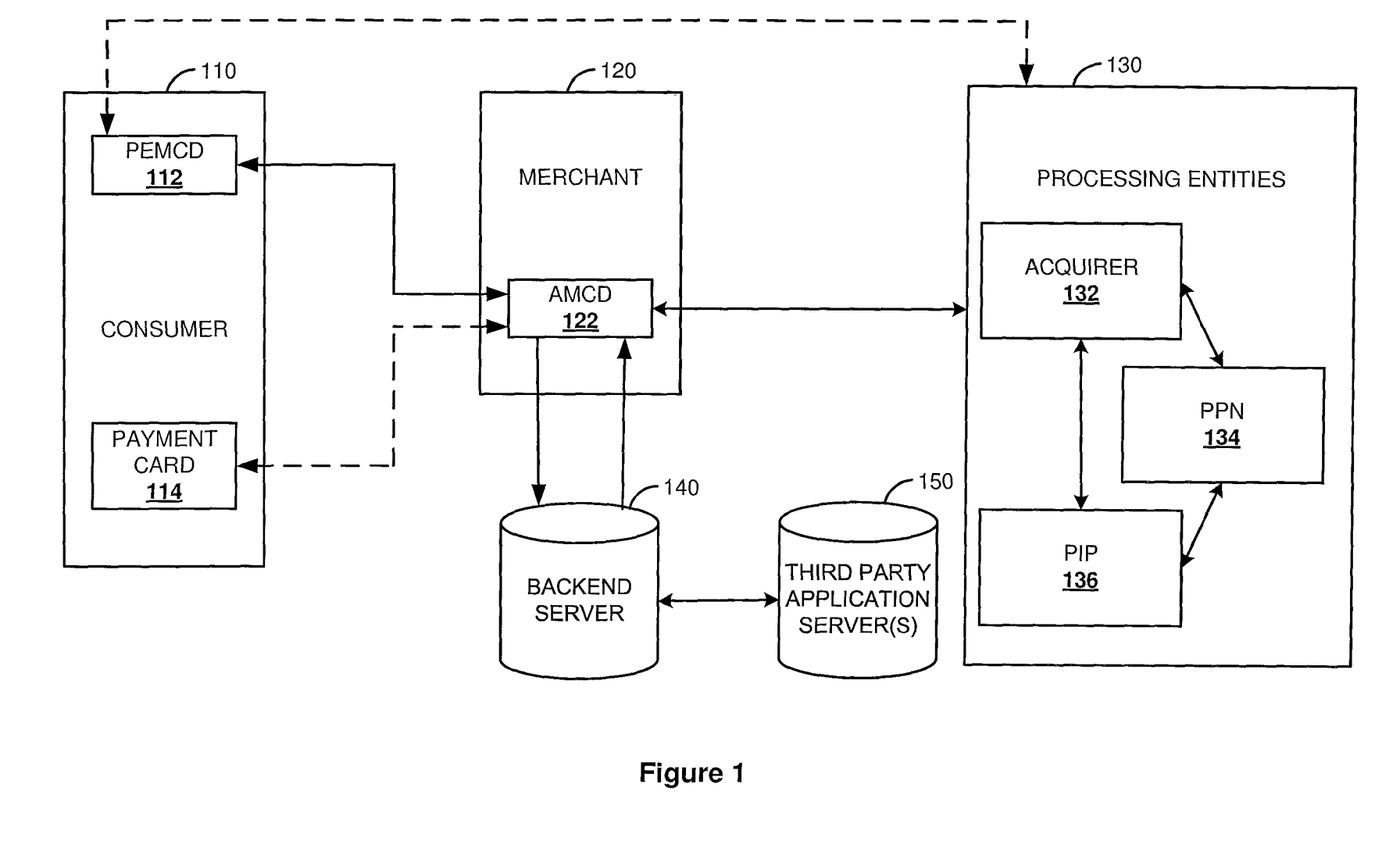
FIG. 1 is a block diagram of an embodiment of a system for payment transactions with integrated POS terminals.

FIG. 1 is a block diagram of an embodiment of a system for payment transactions with integrated POS terminals. A merchant 120 accepts card present payments directly on a mobile telecommunication device. A card present payment is defined as a payment transaction where the buyer and the merchant are present at the same time at the same place. Payment can be done by a contactless card or a payment enabled mobile communication device. The mobile telecommunication device on which the merchant 120 accepts payments supports Near Filed Communication (NFC®) or another communication interface, without any need for additional external hardware, such as POS terminals. Such device is referred to as accepting mobile communication device (AMCD) 122. The accepting mobile communication device 122 is envisaged to be mainly any commercially available mobile smart phone with characteristics described below but can also be any other mobile communication device (such as tablet, smart watch, wearable device, etc.) with such characteristics. Integrated POS terminals are defined as POS terminals integrated in the accepting mobile communication device.

In a typical purchase transaction, a consumer 110 selects items (e.g., products and/or services) to purchase from a merchant 120. A list of the items in the transaction, the total amount of the transaction, and a merchant identification (ID) along with other transaction information is shown on the accepting mobile communication device (AMCD) 122 of the merchant.

The consumer 110 interacts and sends a request for a payment transaction with a contactless payment card 114 or a payment enabled mobile communication device (PEMCD) 112. The contactless payment card 114 may be any contactless credit or debit card. The merchant 120 can accept payments from a contactless credit/debit payment card 114, from a mobile smart phone or another mobile telecommunication device supporting payment card digitization (such as ApplePay®, Android Pay®, SamsungPay®, etc) or from a mobile smart phone or another mobile telecommunication device which carries, or can access, relevant payment information and can transmit it (for example, making a payment from a bank account or from an e-wallet such as PayPal®). Such devices are referred to as PEMCD 112.

The AMCD 122 of the merchant 120 receives a request for a payment transaction from the consumer 110. The request includes payment information and transaction information. As used herein, payment information can refer to any information related to the provision of funds for the successful completion of the transaction. Some examples of such information include payment card credentials: primary account number (PAN), expiration date, card validation code (CVC) and an authentication token. As used herein, transaction information can refer to any information related to the transaction. Some examples of such information include: a list of the items in the transaction, a description of the items, item identifiers, e.g., stock keeping units (SKUs), the merchant ID, access device ID (e.g., POS terminal ID), prices of the items being purchased, total number of items, total amount of the transaction, electronic signature from merchant 120, a transaction code, consumer ID and other suitable information related to the transaction.

In one embodiment, the payment information is received from a payment information provider (PIP) 136, which is in direct communication with the PEMCD 112 of the consumer 110. The direct communication is achieved via a Payment Information Access (PIA) module residing in the PEMCD 112. The PIA module is used for accessing, processing and transmitting payment information in a secure way. The PIA module may be implemented in hardware, firmware, software or some combination thereof and may reside in a secure element, e.g. a subscriber identity module (SIM), universal integrated circuit card (UICC), Embedded Secure Element (ESE), Trusted Execution Environment (TEE) or a secure environment. The PIA module can be compliant with the EMV standard and use Public Key Infrastructure (PKI) type of security certificate based solution. In some embodiments, PEMCD 112 may have associated a cryptographic certificate with its PIA module, the certificate including a public key of a public and private key pair. The certificate is issued by and the private key is signed by a trusted third party, like a payment card scheme, a Certificate Authority, a bank or similar. In such embodiments the private key is stored in a secure element. In some embodiments, the PIA module may include a PIA profile. The PIA profile includes information such as: primary account number and other information, risk management information, payment processing information, payment limits, etc.

The merchant 120 also receives authentication from the consumer 110 via the AMCD 122. In one embodiment the merchant 120 may request the consumer 110 to enter personal identification number (PIN) or other authorization method on the AMCD 122. In another embodiment, the authentication from the consumer 110 may be provided to the AMCD 122 through the PEMCD 112. For example, the consumer 110 enters PIN or other authorization method, such as fingerprint, on the PEMCD 112.

In some embodiments, the transaction system may also include a backend server 140 in direct communication with the AMCD 122. The backend server 140 orchestrates the communication with third party applications, which a merchant 120 is subscribed for. The backend server 140 is in direct communication with one or more third party application servers 150 that host services, which the merchant 120 is subscribed for. Such a service can be a loyalty program for example. The backend server 140 receives the transaction information from the AMCD 122 and sends it to the third party application servers 150. The third party application servers 150 can modify the transaction information. The modification may include, for example, redeeming bonus points, applying vouchers or discounts and then recalculating a payable total. The backend server 140 collects the modified transaction information from the third party application servers 150 and forwards it to the AMCD 122. Each of the backend server 140 and the third party application servers 150 include a processor in communication with a memory storage unit containing executable program instructions that cause the processor to control the backend server and the one or more third party application servers.

Turning back to FIG. 1, after the merchant 120 receives the initial request for a payment transaction and also an authentication from the consumer 110, the AMCD 122 sends an authorization request message to one or more processing entities 130. The authorization request message includes the payment information and the transaction information. As mentioned above, in some embodiments the transaction information may had been modified by one or more third party application servers 150 via a backend server 140.

In addition, the authorization request message is encrypted by a point-of-sale module (POS module) residing in a secure element within the AMCD 122. The point-of-sale module is used for processing and transmitting transaction and payment information in a secure way. The point-of-sale module may be implemented in hardware, firmware, software or some combination thereof and may reside in a secure element, e.g. a subscriber identity module (SIM), universal integrated circuit card (UICC), Embedded Secure Element (ESE), Trusted Execution Environment (TEE) or a secure environment. The point-of-sale module can be compliant with the EMV standard and use Public Key Infrastructure (PKI) type of security certificate based solution. In some embodiments, AMCD 122 may have associated a cryptographic certificate with its point-of-sale module, the certificate including a public key of a public and private key pair. The certificate is issued by and the private key is signed by a trusted third party, like a payment card scheme, a Certificate Authority, a bank or similar. In such embodiments the private key is stored in a secure element. In some embodiments, the point-of-sale module may include a POS profile. The PUS profile includes information such as: primary account number and other information, risk management information, payment processing information, information about accepted cards type, etc.

The processing entities 130 process the authorization request message and send an authorization response message to the AMCD 122. The processing includes determination whether to authorize or decline the transaction and the authorization response message includes the outcome of this determination. The processing entities 130 may decline the transaction for a variety of reasons (e.g., insufficient funds, risky transaction, etc.).

In some embodiments, if additional information or confirmation is needed from the consumer 110, the processing entities 130 may request such information from the consumer 110 (e.g. SMS confirmation, activation code entered in a specialized software or other confirmation method). In one embodiment this is performed by assessing the payment information in the authorization request message and requesting additional information or confirmation from the consumer 110.

After the merchant 120 receives the authorization response message to the AMCD 122, then the authorization response message is provided to the consumer 110. The authorization response message may be displayed on a display of AMCD 122 or may be printed on a receipt. In some embodiments the processing entities 130 may send the authorization response message directly to the consumer 110. For example, the authorization response message may be sent from the processing entities 130 directly to the PEMCD 112.

In one embodiment, the processing entities 130 include an acquirer 132, a payment processing network (PPN) 134, and a payment information provider (PIP) 136. The acquirer 132 may include, for example, a bank or another payment institution holding an account of the merchant 120.

The PPN 134 may include data processing subsystems, networks, and operations used to support and deliver authorization services, exception file services, and clearing and settlement services. An example of a payment processing network 134 may include VisaNet®, MasterCard® Network, and others. Payment processing networks such as VisaNet® or MasterCard® Network are able to process credit card transactions, debit card transactions, and other types of commercial transactions.

PIP 136 may include a bank, financial institution, e-wallet provider, etc. Payment information provider 136 may refer to any suitable entity that can approve a transaction, and may optionally open and maintain an account associated with consumer 110. Some examples of payment information providers may be a bank, an e-money issuer, a business entity such as a retail store, or a governmental entity. The payment information provider 136 may be associated with the payment enabled mobile communication device 112 or with the contactless payment card 114 in any suitable manner. For example, the payment information provider 136 may hold an account that is linked to a user ID of the consumer 110. In another example, PIP 136 may have issued the contactless payment card 114 or a virtual payment card that is stored on the PEMCD 112. In yet another embodiment, the payment information provider 136 may be a bank which consumer 110 has an account with. In the cases where the PIP has issued a physical payment contactless card or virtual payment card stored on the PEMCD 112, the PIP is known in the industry as an issuer.

Turning back to the embodiment, wherein the processing entities 130 include an acquirer 132, a PPN 134, and a PIP 136, the acquirer 132 receives the authorization request message and forwards it to the payment processing network 134. The acquirer 132 is also responsible to send the authorization response message to the AMCD 122. The payment processing network 134 sends the authorization request message to a payment information provider 136 and sends the authorization response message to the acquirer 132. The payment information provider 136 processes the authorization request message and sends the authorization response message to the payment processing network 134.

In another embodiment the processing entities include an acquirer 132 and a payment processing network 134. The acquirer 132 receives the authorization request message and forwards it to the payment processing network 134. The acquirer 132 is also responsible to send the authorization response message to the AMCD 122. The payment processing network 134 processes the authorization request message and sends the authorization response message to the acquirer 132.

In another embodiment the processing entities include an acquirer 132 and a payment information provider 136. The acquirer 132 receives the authorization request message and forwards it to the payment information provider 136. The acquirer 132 is also responsible to send the authorization response message to the AMCD 122. The payment information provider 136 processes the authorization request message and sends the authorization response message to the acquirer 132.

In another embodiment the processing entities include a payment processing network 134, and a payment information provider 136. The payment processing network 134 receives the authorization request message and sends it to the payment information provider 136. The payment processing network 134 is also responsible to send the authorization response message to the AMCD 122. The payment information provider 136 processes the authorization request message and sends the authorization response message to the payment processing network 134.

In another embodiment the processing entities include an acquirer 132. The acquirer 132 receives the authorization request message, processes the authorization request message and sends the authorization response message to the AMCD 122.

In another embodiment the processing entities include a payment processing network 134. The payment processing network 134 receives the authorization request message, processes the authorization request message and sends the authorization response message to the AMCD 122.

In another embodiment the processing entities include a payment information provider 136. The payment information provider 136 receives the authorization request message, processes the authorization request message and sends the authorization response message to the AMCD 122.

In some embodiments, the acquirer 132 and the payment processing network 134 may be a single entity.

In some embodiments the acquirer 132 and the payment information provider 136 may be a single entity.

In some embodiments, the payment processing network 134 and the payment information provider 136 may be a single entity.

In some embodiments, the acquirer 132, the payment processing network 134 and the payment information provider 136 may be a single entity.

Figure 2:
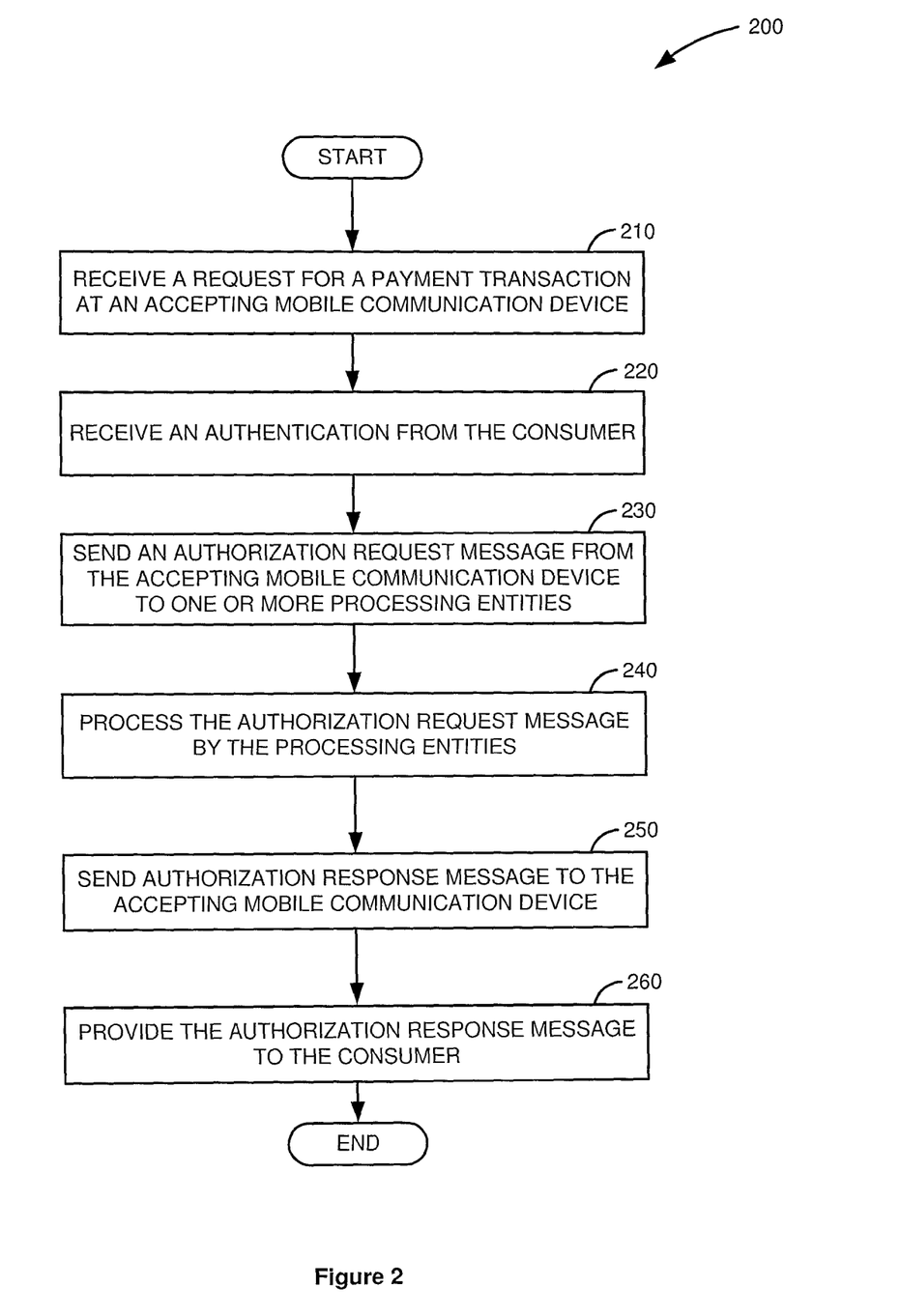
FIG. 2 is a flow diagram of an embodiment of a method for payment transactions with integrated POS terminals.

FIG. 2 is a flow diagram of an embodiment of a method 200 for payment transactions with integrated POS terminals. The method starts at 210 with receiving a request for a payment transaction at an accepting mobile communication device (AMCD), such as AMCD 122 of the merchant 120. The request is sent by a consumer, such as the consumer 110. The request includes payment information and transaction information. In one embodiment, the request is sent via a contactless payment card of the consumer, for example, payment card 114 of the consumer 110. In another embodiment, the request is sent via a payment enabled mobile communication device of the consumer, such as PEMCD 112 of the consumer 110. In yet another embodiment, the payment information is received from a digitized card on the payment enabled mobile communication device.

In one embodiment, the payment information is received from a payment information provider, which is in direct communication with the payment enabled mobile communication device, such as PEMCD 112 of the consumer 110. The direct communication is achieved via a Payment Information Access (PIA) module residing in the payment enabled mobile communication device. The PIA module is used for accessing, processing and transmitting payment information in a secure way. The PIA module may be implemented in hardware, firmware, software or some combination thereof and may reside in a secure element, e.g. a subscriber identity module (SIM), universal integrated circuit card (UICC), Embedded Secure Element (ESE), Trusted Execution Environment (TEE) or a secure environment. The PIA module can be compliant with the EMV standard and use Public Key Infrastructure (PKI) type of security certificate based solution. In some embodiments, the payment enabled mobile communication device may have associated a cryptographic certificate with its PIA module, the certificate including a public key of a public and private key pair. The certificate is issued by and the private key is signed by a trusted third party, like a payment card scheme, a Certificate Authority, a bank or similar. In such embodiments the private key is stored in a secure element. In some embodiments, the PIA module may include a PIA profile. The PIA profile includes information such as: primary account number and other information, risk management information, payment processing information, payment limits, etc.

Turning back to FIG. 2, at 220, an authentication from the consumer is received at the AMCD, such as AMCD 122 of the merchant 120. In one embodiment the merchant may request the consumer to enter personal identification number (PIN) or other authorization method on the AMCD. In another embodiment, the authentication from the consumer may be provided to the AMCD through a PEMCD, such as PEMCD 112, of the consumer 110. For example, the consumer 110 enters PIN or other authorization method, such as fingerprint, on the PEMCD 112.

At 230 an authorization request message is sent from the AMCD to one or more processing entities. The processing entities may be such as the processing entities 130 in FIG. 1, which include an acquirer 132, a PPN 134, and a PIP 136. The authorization request message includes the payment information and the transaction information. In one embodiment, the transaction information may be modified, before being sent to the processing entities. The process of modification is presented further in FIG. 3. In addition, the authorization request message is encrypted by a point-of-sale module residing in a secure element within the AMCD. The point-of-sale module is used for processing and transmitting transaction and payment information in a secure way. The point-of-sale module may be implemented in hardware, firmware, software or some combination thereof and may reside in a secure element, e.g. a subscriber identity module (SIM), universal integrated circuit card (UICC), Embedded Secure Element (ESE), Trusted Execution Environment (TEE) or a secure environment. The point-of-sale module can be compliant with the EMV standard and use Public Key Infrastructure (PKI) type of security certificate based solution. In some embodiments, AMCD may have associated a cryptographic certificate with its point-of-sale module, the certificate including a public key of a public and private key pair. The certificate is issued by and the private key is signed by a trusted third party, like a payment card scheme, a Certificate Authority, a bank or similar. In such embodiments the private key is stored in a secure element. In some embodiments, the point-of-sale module may include a POS profile. The POS profile includes information such as: primary account number and other information, risk management information, payment processing information, information about accepted cards type, etc.

At 240 the authorization request message is processed by the processing entities. The processing includes determination whether to authorize or decline the transaction. The processing entities may decline the transaction for a variety of reasons (e.g., insufficient funds, risky transaction, etc.). In some embodiments, if additional information or confirmation is needed from the consumer, the processing entities may request such information from the consumer (e.g. SMS confirmation, activation code entered in a specialized software). In one embodiment this is performed by assessing the payment information in the authorization request message and requesting additional information or confirmation from the consumer.

After the processing of the authorization request, at 250, an authorization response message is sent to the AMCD, such as AMCD 122, by the processing entities, such as processing entities 130. The authorization response message includes the outcome of this processing.

In one embodiment, the processing entities include an acquirer, such as acquirer 132, a PPN, such as PPN 134, and a PIP, such as PIP 136. In this embodiment, the processing of the authorization request includes the following steps: the authorization request message is received by the acquirer and forwards it to the payment processing network. The payment processing network sends the authorization request message to the payment information provider. The payment information provider processes the authorization request message and sends the authorization response message to the payment processing network. The payment processing network forwards the authorization response message to the acquirer and the acquirer sends the authorization response message to the AMCD.

In another embodiment the processing entities include an acquirer, such as acquirer 132 and a payment processing network, such as PPN 134. In this embodiment, the processing of the authorization request includes the following steps: the authorization request message is received by the acquirer and forwards it to the payment processing network. The payment processing network processes the authorization request message and sends the authorization response message to the acquirer. The acquirer sends the authorization response message to the AMCD.

In another embodiment the processing entities include an acquirer, such as the acquirer 132 and a payment information provider, such as PIP 136. In this embodiment, the processing of the authorization request includes the following steps: the acquirer receives the authorization request message and forwards it to the payment information provider. The payment information provider processes the authorization request message and sends the authorization response message to the acquirer. The acquirer sends the authorization response message to the AMCD.

In another embodiment the processing entities include a payment processing network, such as PPN 134, and a payment information provider, such as PIP 136. In this embodiment, the processing of the authorization request includes the following steps: the payment processing network receives the authorization request message and sends it to the payment information provider. The payment information provider processes the authorization request message and sends the authorization response message to the payment processing network. The payment processing network sends the authorization response message to the AMCD.

In another embodiment the processing entities include an acquirer, such as acquirer 132. The acquirer receives the authorization request message, processes the authorization request message and sends the authorization response message to the AMCD.

In another embodiment the processing entities include a payment processing network, such as PPN 134. The payment processing network receives the authorization request message, processes the authorization request message and sends the authorization response message to the AMCD.

In another embodiment the processing entities include a payment information provider, such as PIP 136. The payment information provider receives the authorization request message, processes the authorization request message and sends the authorization response message to the AMCD.

In some embodiments, the acquirer, such as acquirer 132, and the payment processing network, such as PPN 134, may be a single entity.

In some embodiments the acquirer, such as acquirer 132 and the payment information provider, such as PPN 136, may be a single entity.

In some embodiments, the payment processing network, such as PPN 134, and the payment information provider, such as PPN 136, may be a single entity.

In some embodiments, the acquirer, such as acquirer 132, the payment processing network, such as PPN 134, and the payment information provider, such as PIP 136, may be a single entity.

Turning back to FIG. 2, after the authorization response message is sent to the AMCD, such as AMCD 122 of a merchant 120, the method ends at 260 with providing the authorization response message to the consumer. The authorization response message may be displayed on a display of the AMCD or may be printed on a receipt. In some embodiments the processing entities may send the authorization response message directly to the consumer. For example, the authorization response message may be sent from the processing entities directly to a PEMCD of the consumer, such as PEMCD 112 of the consumer 110.

Figure 3:
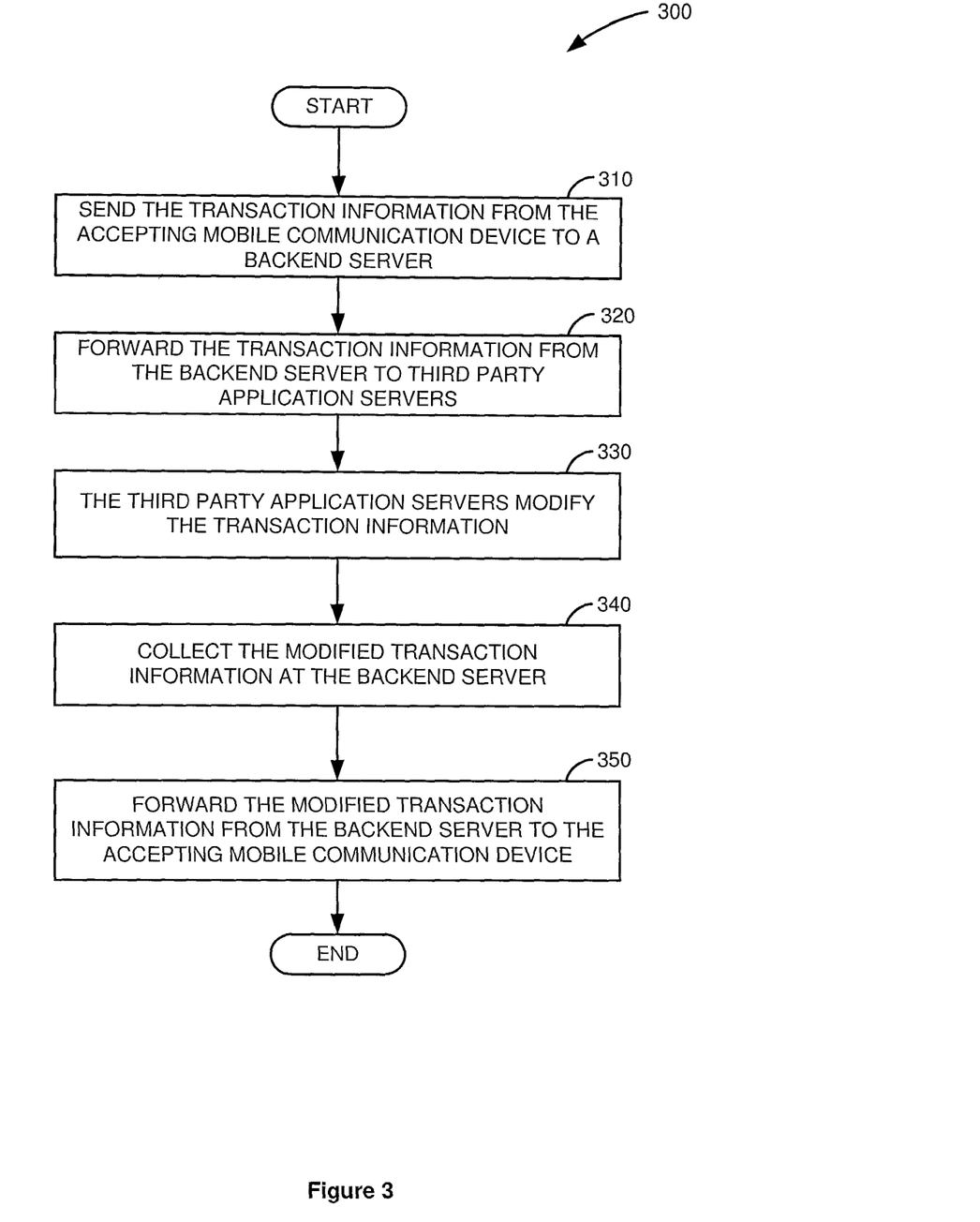
FIG. 3 is flow diagram representing the process of modification of the transaction information according to an embodiment of a method for payment transactions with integrated POS terminals.

FIG. 3 is a flow diagram representing the process 300 of modification of the transaction information according to an embodiment of a method for payment transactions with integrated POS terminals. The process starts at 310 with sending the transaction information from the AMCD, such as AMCD 122 of a merchant 120 to a backend server, such as backend server 140. The backend server orchestrates the communication with third party applications, which a merchant, such as merchant 120 is subscribed for. The backend server is in direct communication with one or more third party application servers, such as third party application servers 150 that host the services, which the merchant 120 is subscribed for. Such a service can be a loyalty program, for example.

At 320, the transaction information is forwarded from the backend server, such as backend server 140, to the one or more third party application servers, such as third party application servers 150.

At 330, the third party application servers, such as third party application servers 150, modify the transaction information. The modification may include, for example, redeeming bonus points, applying vouchers or discounts and then recalculating a payable total.

At 340, the modified transaction information is collected at the backend server.

At 350, the modified transaction information is forwarded from the backend server to the AMCD.

Figure 4:
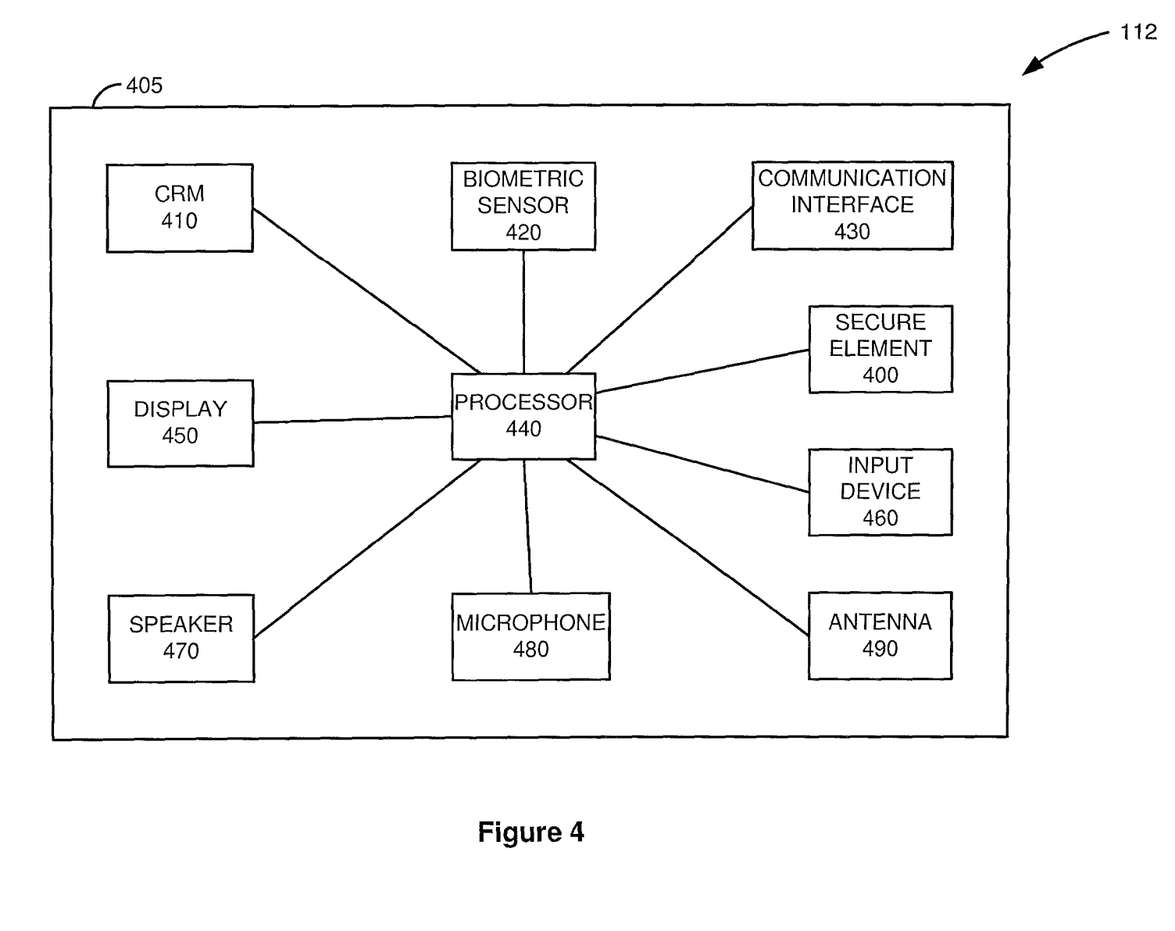
FIG. 4 is a block diagram representing a payment enabled mobile communication device according to an embodiment of a system for payment transactions with integrated POS terminals.

FIG. 4 is a block diagram representing a payment enabled mobile communication device according to an embodiment of a system for payment transactions with integrated POS terminals. The exemplary payment enabled mobile communication device, such as PEMCD 112 of FIG. 1, is in the form of a smart phone, in accordance with an embodiment of the disclosure. The payment enabled mobile communication device 112 includes a body 405. The payment enabled mobile communication device 112 may include a computer readable medium (CRM) 410. The computer readable medium 410 may be integrated within the PEMCD 112 or may be detachable from it. CRM 410 may be a memory element storing data. The memory preferably stores information such as financial information, transit information: credit or debit card number information, authentication tokens, account balance information, expiration date, consumer information such as name, date of birth, etc. Any of this information may be transmitted by the PEMCD 112. CRM 410 may contain any suitable software. In some embodiments this can be a mobile wallet enabling users to pay on contactless payment terminal, for example Android Pay®. Software installed on CRM 410 may interact with a Payment Information Access application stored in a secure element 400 for the purpose of accessing and receiving payment information.

Secure element 400 may be inserted in, embedded or built-in to the PEMCD 112. The secure element can be: a SIM, UICC, ESE or a TEE. The secure element 400 may store a certificate including a public key of a public and private key pair. The secure element 400 may also store a Payment Information Access application and a Payment Information Access profile. The Payment Information Access application runs within the secure element 400, so no sensitive information is exposed.

PEMCD 112 may also include a communication interface 430 capable of transferring and receiving data using a near field communication (NFC) capability (or near field communications medium) typically in accordance with a standardized protocol or data transfer mechanism (e.g., ISO 14443/NFC). This can be used for transferring payment information to a contactless payment terminal or to an accepting mobile communication device, such as AMCD 122.

PEMCD 112 may also include a processor 440 (e.g., a microprocessor) for processing the functions of PEMCD 112 and a display 450 where from a user can see the displayed information. Display 450 can be used for transferring authentication tokens, for example in the form of barcode or QR code.

PEMCD 112 may further include an input device 460, a speaker 470, and a microphone 480 to allow a consumer to interact with the PEMCD 112.

The PEMCD 112 may also include an antenna 490 for wireless data transfer (e.g., data transmission) and a biometric sensor 420, which can be a fingerprint reader, for example, and can be used as a verification method by a consumer, such as the consumer 110.

Figure 5:
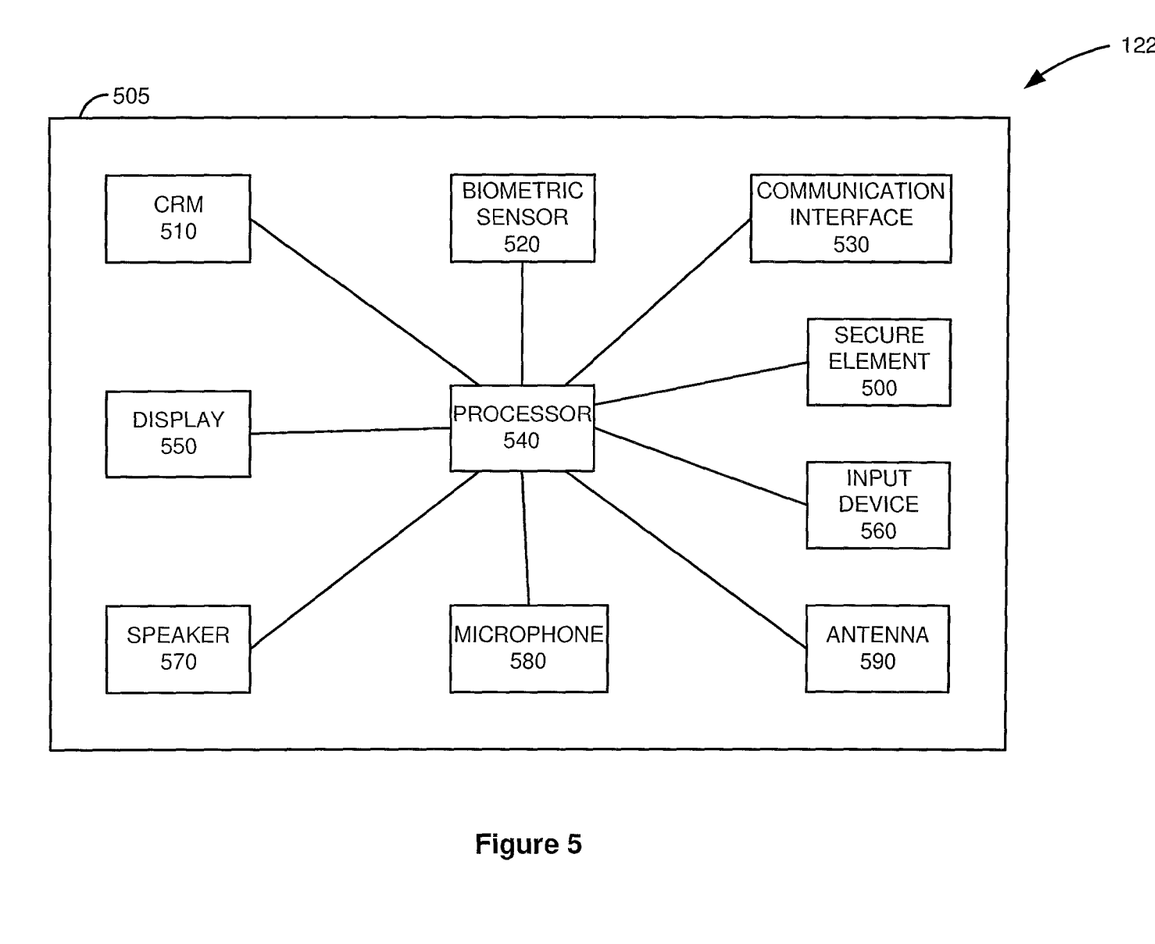
FIG. 5 is a block diagram representing an accepting mobile communication device according to an embodiment of a system for payment transactions with integrated POS terminals.

FIG. 5 is a block diagram representing an accepting mobile communication device according to an embodiment of a system for payment transactions with integrated POS terminals. The exemplary accepting mobile communication device, such as AMCD 122 of FIG. 1, is in the form of a smart phone, in accordance with an embodiment of the disclosure. AMCD 122 includes a body 505. AMCD 122 may include a computer readable medium (CRM) 510. CRM 510 may be integrated within the AMCD 122 or may be detachable from it. CRM 510 may be a memory element storing data. The memory preferably stores merchant and POS information: stock units, currency exchange rates, staff schedule, etc. CRM 510 may contain any suitable software. In some embodiments this can be a point of sale software for running merchants' sales, loyalty programs and other merchant related software. Software installed on CRM 510 may interact with POS application stored in a secure element 500 for the purpose of conducting payment transactions.

Secure element 500 may be inserted in, embedded or built-in to the AMCD 122. The secure element can be: a SIM, UICC, ESE or a TEE. The secure element 500 may store a certificate including a public key of a public and private key pair. The secure element 500 may also store a POS application and a POS profile. The POS application runs within the secure element 500, so no sensitive information is exposed.

AMCD 122 may include a communication interface 530. The communication interface 530 may include, for example, RF (radio frequency) or NFC antennas, magnetic stripe readers or a camera to interact with the PEMCD 112 or a contactless payment card 114.

The AMCD 122 may also include a processor 540 (e.g., a microprocessor) for processing the functions of the AMCD 122. The AMCD may include a display 550 where from a consumer, such as the consumer 110 can see the amount of the transaction to be paid or which can be used for transferring information, for example in the form of barcode or QR code. The AMCD 122 may include, an input device 560 where a consumer can verify his identity, for example, by entering a PIN.

AMCD 122 may also include an antenna 590 for wireless data transfer (e.g., data transmission). The AMCD 122 may also include a speaker 570 and a microphone 580 for interaction with the AMCD 122. The AMCD 122 may also include a biometric sensor 520, which can be a fingerprint reader, and can be used for transaction and payment information verification.

The foregoing description, for purposes of explanation, used specific nomenclature to provide a thorough understanding of the invention. However, it will be apparent to one skilled in the art, that specific details are not required in order to practice the invention. Thus, the foregoing descriptions of specific embodiments of the invention are presented for purposes of illustration and description. They are not intended to be exhaustive or to limit the invention to the precise forms disclosed; obviously, many modifications and variations are possible in view of the above teachings. The embodiments were chosen and described in order to best explain the principles of the invention and its practical applications, they thereby enable others skilled in the art to best utilize the invention and various embodiments with various modifications as are suited to the particular use contemplated. It is intended that the following claims and the equivalents define the scope of the invention.

The invention claimed is:

1. A system for handling payment transactions comprising:
an accepting mobile communication device (AMCD) of a merchant configured to communicate with different processing entities, the AMCD integrates a point-of-sales (POS) module and forms an integrated POS terminal device, wherein the AMCD of the merchant includes
a secure element which provides a secured environment,
the POS module, the POS module resides within the secure element, the POS module is configured to
receive a payment transaction request including payment information and transaction information from a consumer, wherein the payment information includes payment card information specific of a processing network associated with the payment transaction request,
process the payment transaction request which includes analyzing and validating the payment information,
generate an authorization request by the POS module,
encrypt the authorization request message by the POS module to produce an encrypted authorization request, and
submit, by the POS module, the encrypted authorization request message to the processing entity associated with the payment transaction request.

2. The system of claim 1, wherein the payment transaction request is sent from a contactless payment card of the consumer via NFC.

3. The system of claim 1, wherein the payment transaction request is sent via a payment enabled mobile communication device of the consumer.

4. The system of claim 3, wherein the payment information is received from a digitized card on the payment enabled mobile communication device.

5. The system of claim 3, wherein the payment information is received from a payment information provider, and wherein the payment enabled mobile communication device is in direct communication with the payment information provider via a payment information access module residing in the payment enabled mobile communication device.

6. The system of claim 3, wherein the POS module is further configured to receive an authentication from the consumer through the payment enabled mobile communication device.

7. The system of claim 1, further comprising:
a backend server arranged to:
receive the transaction information from the AMCD;
send the transaction information to one or more third party application servers of services the merchant is subscribed for;
collect a modified transaction information from the one or more third party application servers; and
forward the modified transaction information to the AMCD; and
the one or more third party application servers arranged to:
receive the transaction information from the backend server;
modify the transaction information; and
send the modified transaction information to the backend server,
wherein each of the backend server and the one or more third party application servers include a processor in communication with a memory storage unit containing executable program instructions that cause the processor to control the backend server and the one or more third party application servers.

8. The system of claim 1, wherein the AMCD comprises a commercially available off-the-shelf NFC enabled mobile device which includes a smart phone, and the POS module is further configured to receive an authorization response message from the processing entity associated with the payment transaction request.

9. The system of claim 1, wherein the processing entity comprises:
an acquirer arranged to:
receive the authorization request message; and
forward the authorization request message to a payment processing network; and
send an authorization response message to the AMCD;
the payment processing network arranged to:
send the authorization request message to a payment information provider; and
forward the authorization response message to the acquirer; and
the payment information provider arranged to:
process the authorization request message; and
send the authorization response message to the payment processing network.

10. The system of claim 1, wherein the processing entity comprises:
an acquirer arranged to:
receive the authorization request message; and
forward the authorization request message to a payment processing network; and
send an authorization response message to the AMCD; and
the payment processing network arranged to:
process the authorization request message; and
send the authorization response message to the acquirer.

11. The system of claim 1, wherein the processing entity comprises:
a payment processing network arranged to:
receive the authorization request message;
send the authorization request message to a payment information provider; and
send an authorization response message to the AMCD; and
the payment information provider arranged to:
process the authorization request message;
send the authorization response message to the payment processing network.

12. The system of claim 1, wherein the processing entity comprises:
an acquirer arranged to:
receive the authorization request message; and
forward the authorization request message to a payment information provider; and
send an authorization response message to the AMCD; and
the payment information provider arranged to:
process the authorization request message; and
send the authorization response message to the acquirer.

13. The system of claim 1, wherein the processing entity comprises an acquirer arranged to:
receive the authorization request message;
process the authorization request message; and
send an authorization response message to the AMCD.

14. The system of claim 1, wherein the processing entity comprises a payment information provider arranged to:
receive the authorization request message;
process the authorization request message; and
send an authorization response message to the AMCD.

15. The system of claim 1, wherein the processing entity comprises a payment processing network arranged to:
receive the authorization request message;
process the authorization request message; and
send an authorization response message to the AMCD.

16. A method for handling payment transactions using an accepting mobile communication device (AMCD) of a merchant configured to communicate with different processing entities, the AMCD integrates a point-of-sales (POS) module residing in a secure element of the AMCD and forms an integrated POS terminal device of the merchant, the method comprises:
receiving a payment transaction request by the POS module of the integrated POS terminal of the merchant from a consumer, the payment transaction request includes payment information and transaction information, wherein the payment information includes payment card information specific of a processing network associated with the payment transaction request;
processing the payment transaction request by the POS module of the integrated POS terminal of the merchant, wherein processing includes analyzing and validating the payment information;

generating an authorization request message by the POS module of the integrated POS terminal of the merchant;

encrypting the authorization request by the POS module to produce an encrypted authorization request; and submitting the encrypted authorization request message by the POS module of the integrated POS terminal to the processing entity associated with the payment transaction request.

17. The method of claim 16, wherein the payment transaction request is sent from a contactless payment card of the consumer via NFC.

18. The method of claim 16, wherein the payment transaction request is sent via a payment enabled mobile communication device of the consumer.

19. The method of claim 18, wherein the payment information is received from a digitized card on the payment enabled mobile communication device.

20. The method of claim 18, wherein the payment information is received from a payment information provider, and wherein the payment enabled mobile communication device is in direct communication with the payment information provider via a payment information access module residing in the payment enabled mobile communication device.

21. The method of claim 18, further comprises receiving an authentication by the POS module from the consumer through the payment enabled mobile communication device.

22. The method of claim 16, further comprising:
sending the transaction information from the AMCD to a backend server;
forwarding the transaction information from the backend server to one or more third party application servers of services the merchant is subscribed for;
the one or more third party applications servers modifying the transaction information;
collecting the modified transaction information at the backend server from the one or more third party application servers; and
forwarding the modified transaction information from the backend server to the AMCD,
wherein each of the backend server and the one or more third party application servers include a processor in communication with a memory storage unit containing executable program instructions that cause the processor to control the backend server and the one or more third party application servers.

23. The method of claim 16, further comprising:
receiving an authorization response message by the POS module from the processing entity associated with the payment transaction request, wherein the AMCD comprises a commercially available off-the-shelf NFC enabled mobile device which includes a smart phone.

24. The method of claim 16, wherein the processing entity is configured to process the authorization request message and send an authorization response message to the POS module including:
receiving the authorization request message by an acquirer;
forwarding the authorization request message from the acquirer to a payment processing network;
the payment processing network sending the authorization request message to a payment information provider;
processing the authorization request message by the payment information provider and sending the authorization response message to the payment processing network;
forwarding the authorization response message from the payment processing network to the acquirer; and
sending the authorization response message from the acquirer to the POS module.

25. The method of claim 16, wherein the processing entity is configured to process the authorization request message and send an authorization response message to the POS module including:
receiving the authorization request message by an acquirer;
forwarding the authorization request message from the acquirer to a payment processing network;
the payment processing network processing the authorization request message and sending the authorization response message to the acquirer; and
sending the authorization response message from the acquirer to the POS module.

26. The method of claim 16, wherein the processing entity is configured to process the authorization request message and send an authorization response message to the POS module including:
receiving the authorization request message by a payment processing network;
the payment processing network sending the authorization request message to a payment information provider;
processing the authorization request message by the payment information provider and sending the authorization response message to the payment processing network; and
sending the authorization response message from the payment processing network to the POS module.

27. The method of claim 16, wherein the processing entity is configured to process the authorization request message
receiving the authorization request message by an acquirer;
forwarding the authorization request message from the acquirer to a payment information provider;
the payment information provider processing the authorization request message and sending the authorization response message to the acquirer; and
sending the authorization response message from the acquirer to the POS module.

28. The method of claim 16, wherein the processing entity is configured to process the authorization request message and send an authorization response message to the POS module including:
receiving the authorization request message by an acquirer;
processing the authorization request message by the acquirer; and
sending the authorization response message from the acquirer to the POS module.

29. The method of claim 16, wherein the processing entity is configured to process the authorization request message and send an authorization response message to the POS module including:
receiving the authorization request message by a payment information provider;
processing the authorization request message by the payment information provider; and
sending the authorization response message from the payment information provider to the POS module.

30. The method of claim 16, wherein the processing entity is configured to process the authorization request message and send an authorization response message to the POS module including:

receiving the authorization request message by a payment processing network;
processing the authorization request message by the payment processing network; and
sending the authorization response message from the payment processing network to the POS module.

* * * * *